United States Patent
Boulton et al.

(10) Patent No.: US 6,744,748 B1
(45) Date of Patent: Jun. 1, 2004

(54) METHOD AND APPARATUS FOR MONITORING ERRORS IN A WIRELESS TRANSCEIVER

(75) Inventors: Philip Andrew Boulton, Vancouver (CA); Sukhdeep Hundal, Surrey (CA); Huei-Fung (Scott) Shen, Calgary (CA)

(73) Assignee: Vtech Communications Ltd., Tai Po (HK)

( * ) Notice: Subject to any disclaimer, the term of this patent is extended or adjusted under 35 U.S.C. 154(b) by 0 days.

(21) Appl. No.: 09/578,436

(22) Filed: May 25, 2000

(51) Int. Cl.[7] .............................................. H04B 7/204
(52) U.S. Cl. ...................... 370/333; 370/437; 370/468; 370/503
(58) Field of Search ................................ 370/315, 317, 370/318, 324, 329, 330, 331, 332, 333, 436, 437, 468, 503

(56) References Cited

U.S. PATENT DOCUMENTS 5,631,909 A * 5/1997 Weng et al. ................. 714/704
5,754,586 A * 5/1998 Carsello ...................... 375/213
5,815,507 A * 9/1998 Vinggaard et al. .......... 714/704
6,091,718 A * 7/2000 Saunders et al. ........... 370/331
6,167,026 A * 12/2000 Brewer et al. ............... 370/222
6,674,735 B1 * 1/2004 Saunders et al. ........... 370/331

* cited by examiner

*Primary Examiner*—Chi Pham
*Assistant Examiner*—Anh-Vu Ly
(74) *Attorney, Agent, or Firm*—Shaw Pittman LLP

(57) ABSTRACT

An error monitor for indicating the quality of communications on a digital communication channel. One or more error detection mechanisms provide indication when an error occurs. After receipt of an error indication, no further indications are detected until a burst error time window has passed. Error indications are stored in a bin. When time since an error indication has been received exceeds a second time period, the event is removed from the bin. When all slots in the bin contain error indications, an indication of the quality of communications on the channel is provided. Parameters can vary with the strength of the received signal to accommodate long range conditions.

14 Claims, 3 Drawing Sheets

METHOD AND APPARATUS FOR MONITORING ERRORS IN A WIRELESS TRANSCEIVER

BACKGROUND OF THE INVENTION

1. Field of the Invention

This invention relates in general to wireless communication systems. In particular, the invention relates to a method and apparatus for monitoring the quality of a cordless telephone communications link, and automatically managing the link channel assignment to avoid interference and improve audio quality.

2. Background Art

As a result of the constantly improving technology being incorporated into cordless telephones, the sound quality and reliability of such telephones has substantially improved in recent years. By combining the convenience and mobility offered by cordless telephones with continually improving range and audio performance, the consumer's acceptance of cordless telephones in both residential and commercial environments has grown significantly.

One challenge presented to designers of a reliable cordless telephone with superior audio performance is developing a radio frequency ("RF") communications link that can operate reliably even in the presence of external sources of electromagnetic interference. The rapid and broad proliferation of electronic and wireless devices that emit RF energy in recent years has exacerbated this challenge by greatly increasing RF energy emissions across many frequency bands. When a cordless telephone is faced with an interference condition, sound quality can degrade rapidly, such that a voice or data line may become unusable, or a call may be dropped altogether. Accordingly, it is an object of this invention to provide a method and apparatus by which a cordless telephone can avoid radio frequency interference.

One popular method of avoiding interference is by including the capability of communicating over one of a plurality of potential RF frequencies or "channels." Therefore, when interference occurs on the channel on which the cordless telephone is communicating, the communications link can be transitioned to a different channel in hopes that the level of undesired interference energy on the new channel is less than that on the previous channel, such that the quality of communications is improved and the communications link maintained.

Many multi-channel prior art cordless telephones provide the user with a pushbutton switch or the like with which the user can manually prompt the cordless telephone to transition to a new communication channel. During use of such a system, the user directly observes the audible effects of interference on the communications link between the base and handset (the "downlink"). When the user detects that the downlink audio quality becomes poor due to interference, the user can manually prompt the cordless telephone to change channels, and hopefully avoid the interference.

However, this technique based upon the manual changing of channels is inadequate in many respects. If interference occurs in the transmission channel from the cordless handset to the base unit (the "uplink"), the handset user will typically not directly observe the corrupted communications. As a result, the user is likely to continue speaking on the corrupted channel, despite the availability of other uplink channels on which less interference is present. Also, the user may be dissatisfied with the telephone performance by the time they are driven to manually change the channel. Accordingly, it is an object of this invention to automatically detect channel interference on both the uplink and downlink.

Another approach to interference avoidance implemented by some prior art digital cordless telephones is an automatic error monitor circuit that causes the telephone to search for a new channel if the packet error rate exceeds a predetermined level. While such a technique, if implemented on both the handset and base unit, can detect interference in both the uplink and downlink, other material limitations still exist.

In some circumstances, when the range limit of a cordless telephone's transceiver is reached, degradation of the communications link quality is inevitable. Such degradation may cause many prior art cordless telephones to change channels. The cordless handset user with manual channel change capability may react to the degraded audio quality by prompting the cordless telephone to change channels. Likewise, a cordless telephone with a simple error monitor circuit may also react to the degraded communications link, and accordingly increased bit error rate, by forcing a channel change. However, changing to a new communication channel at the limits of a cordless telephone's range typically provides no benefit since channel degradation due to range limitations is generally independent of interference and channel selection. In fact, a channel change may result in further degraded call quality or the complete loss of the communications link if the destination channel suffers greater noise or interference than the channel from which the user switched. Therefore, it is an object of this invention to avoid changing channels when the channel quality degradation is a result of reaching range limitations of the cordless telephone, rather than higher level interference.

Furthermore, sources of RF interference are often intermittent in nature in that they consist of infrequent or nonrecurring bursts of interfering energy of relatively short durations. Therefore, while a burst of interference may heavily degrade a communications link during its active duration, oftentimes such interference is nonrecurring, and the perceived reduction in audio quality is not substantial. Accordingly, the communications channel need not be altered to avoid such nonrecurring interference. By contrast, steady state interference may present a more objectionable degradation to a communications link due to its continuous impact—even when the level of interfering energy is lower than that of an interference burst. However, many prior art error monitors do not differentiate between errors characteristic of bursts of interference, and those resulting from steady-state interference. Accordingly, it is an object of this invention to discern between steady state interference and intermittent interference, and to handle the types appropriately.

In view of the prevalence of cordless telephones used today, cordless telephones may receive transmissions on a tuned channel that originated from a nearby cordless telephone set of the same or related design. Under such circumstances, some cordless telephone error monitors may not identify the interfering communication as erroneous due to the common transmission protocol employed by the intended and interfering transmitters. However, such interference by a similar device could potentially result in problems such as crosstalk, loss of privacy, dropped frames, and/or a dropped call. Accordingly, it is an object of the present invention to detect and compensate for interference caused by another wireless communication device of the same or related design.

These and other objects of the present invention will become apparent to those of ordinary skill in the art in light of the present specifications, drawings and claims.

SUMMARY OF THE INVENTION

The invention indicates when the quality of communications on a digital communication channel is inadequate. One or more error detection mechanisms provide an indication that an error has occurred. The distribution of detected errors over time is evaluated in order to detect a profile indicative of a predetermined error condition.

A channel can be considered unusable when the output of a FIR filter which receives the error detection mechanism signals as an input exceeds a predetermined threshold. The FIR filter taps can be calculated using methods known in the art to detect a desired input error distribution, such as a steady-state error condition or a sudden burst of errors.

The processing power and memory requirements of implementing an FIR filter can be reduced by using a pseudo-FIR-filter. When an error indication is received, the event is stored in a bin. After receipt of an error indication, no further indications are detected until a first time period has passed, thereby providing a window of time within which further errors caused by a single burst of interference will not be detected. When an error has been stored in the bin for a time exceeding a second error window time period, the event is removed from the bin.

When all slots in the bin contain error indications, the quality of communications on the channel is considered inadequate. Multiple alerts can indicate differing channel conditions by analyzing the distribution of error events over the error window time period. If the error indications are distributed somewhat evenly throughout the second time period, the channel may be deemed poor, with a corresponding indication being provided. However, if the error indications are heavily weighted toward the most recent part of the error window time period, the channel may be considered to have recently become unusable, and a different indication is provided.

The error monitor can account for the strength of the received signal in determining when channel performance becomes inadequate. A receive signal strength indication is provided to the error monitor. When receive signal strength is high, errors would be rare or nonexistent in the absence of interference. Therefore, the bin size and the error burst window time can be reduced, thereby increasing the sensitivity of the monitor to errors. On the other hand, when the received signal strength is low, more errors are expected, and it may be desirable to increase the error threshold before a frequency channel change is performed. Therefore, when the received signal strength is low, the bin size and error burst window time can be increased.

DETAILED DESCRIPTION OF THE DRAWINGS

Figure 1:
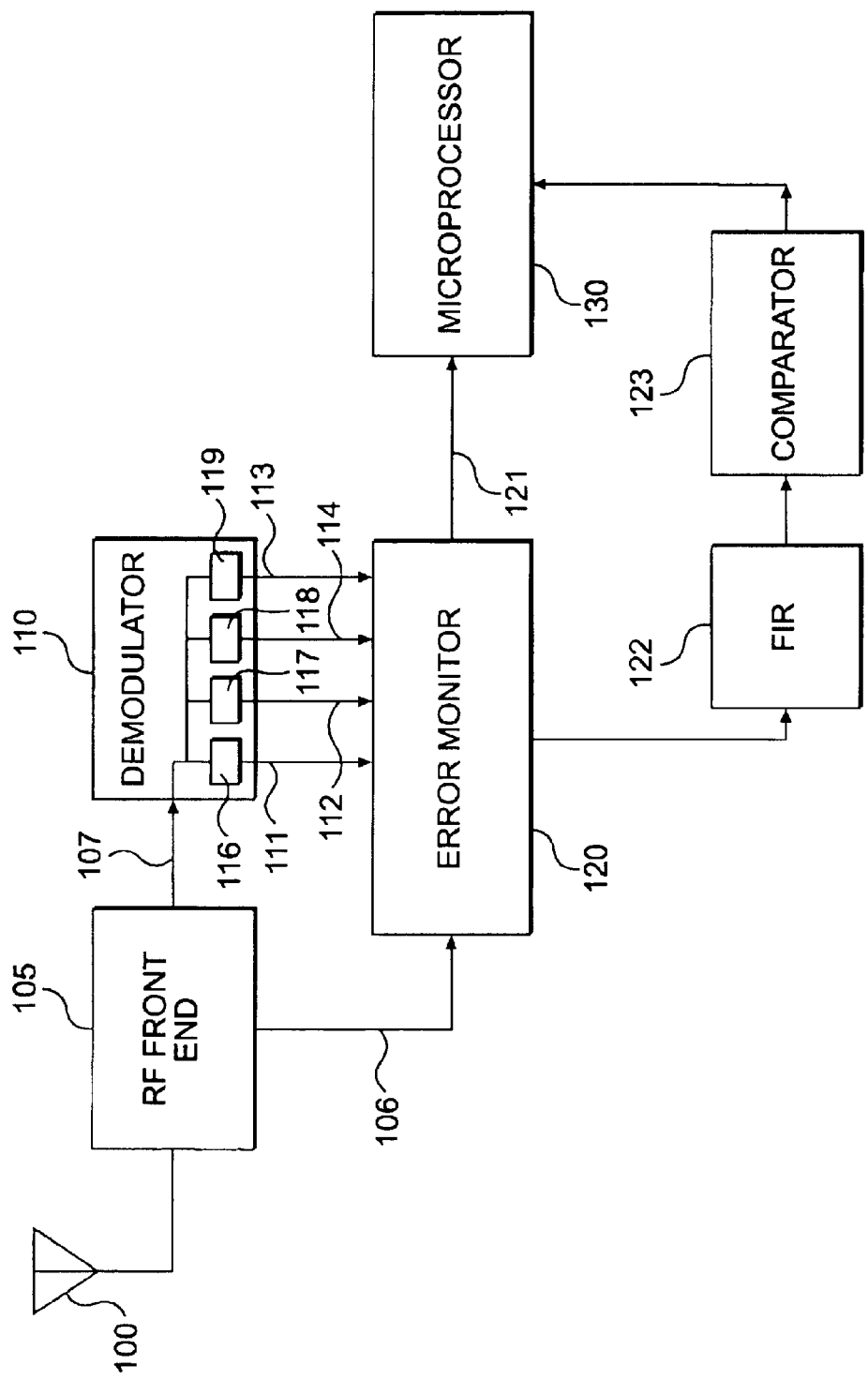
FIG. 1 is a block diagram of one embodiment of the invention.

While this invention is susceptible to embodiment in many different forms, there are shown in the drawings and will be described in detail herein several specific embodiments. The present disclosure is to be considered as an exemplification of the principle of the invention intended merely to explain and illustrate the invention, and is not intended to limit the invention in any way to embodiments illustrated. In particular, while the invention is disclosed in embodiments comprising cordless telephones, it is understood that the invention as revealed can be applied to other wireless digital communication links as well, including wireless computer networks or point-to-point radio systems.

The embodiment of FIG. 1 depicts a cordless telephone system, in block diagram form, that can monitor the quality of a communication link and intelligently change to a new channel when appropriate. In particular, a radio frequency signal is received by antennae 100 and conveyed to receiver front end 105. The received radio frequency communication is comprised of two channels: a D channel, over which control and signaling data is conveyed, and a B channel, over which the voice data is conveyed. The data communicated over the D channel includes a transmitter identification field, which field identifies the unit from which the transmission emanated.

Front end 105 includes a received signal strength indicator ("RSSI") circuit, which provides an indication on line 106 that corresponds to the power level of the received radio frequency signal. The received signal output of receiver front end 105 passes on line 107 to demodulator 110 for final reception and processing.

The embodiment of FIG. 1 determines the bit error rate of the received data stream by employing a plurality of error detection mechanisms. For example, four error detection mechanisms 116, 117, 118, and 119 are implemented within demodulator 110. D channel data includes a checksum and error correction field, whereby demodulator 110 can determine whether a D channel transmission has been received with an uncorrectable error using error detection and correction methods known in the art. A determination that an uncorrectable D channel errors has occurred is conveyed to error monitor 120 on line 111. Similarly, the B channel transmission includes an independent checksum and error correction field, with which demodulator 110 can determine whether a B channel transmission has been received with an uncorrectable error. A determination that an uncorrectable B channel error has occurred is conveyed to error monitor 120 on line 112.

Demodulator 110 incorporates an additional mechanism for determining that the receiver has lost synchronization with the transmission source of the radio frequency communication. Synchronization detection circuits are known in the art. Upon loss of synchronization, an error condition is indicated to error monitor 120 by demodulator 110 on line 114. The indication of an error condition on line 114 is removed upon reacquisition of synchronization by demodulator 110.

Finally, demodulator 110 compares the transmitter identification field of each received communication packet to its own predetermined transmitter identification field. If the fields differ, it is determined that a transmission has been erroneously received from another cordless telephone unit. Accordingly, an error is indicated on line 113 to monitor 120.

While the embodiment of FIG. 1 includes the four above-mentioned error detection mechanisms, a greater or lesser number of detection mechanisms can be utilized and are deemed within the scope of the invention, as is appropriate for a particular application, to measure the error rate of received data. Error Monitor 120 can, for example, simply aggregate the outputs of each error detection mechanism to generate an error stream for channel evaluation.

However, in some applications it may be desirable to detect an error rate that is proportional to the total actual bit error rate. By ensuring that the selected error detection mechanisms satisfy four conditions, their outputs can be aggregated to generate a detected error rate that is proportional to the total actual bit error rate, and improved error monitor performance can be achieved with reduced complexity.

The first condition that allows for constant weighting of an error detection mechanism is that the error detection mechanism should be independent. Independence of error mechanisms ensures that, for example, a given bit error will not be detected by more than one mechanism. Secondly, the error detection mechanisms should be stochastic, so that the detection or non-detection of an error at one moment in time does not influence the probability of detecting an error at a later time. Thirdly, each mechanism's coverage of the bitstream should be a constant fraction of real time. For example, in the embodiment of FIG. 1, the bitstream is active 100% of the time, the D-channel comprises 40% of the bitstream, and the error detection mechanism employed detects 90% of all D-channel errors. Such an embodiment achieves a constant coverage of 1.0*0.4*0.9=36%. If the bitsteam active cycle, the composition of the bitstream or the efficacy of the error detection mechanism change over time, then the third condition would not be satisfied. Finally, the error rate should be small compared to the sampling interval of the error detection mechanisms. Otherwise, a single detected error may encompass multiple actual errors in the received bitstream, and the detected error rate would not necessarily be proportional to the actual error rate.

Provided that sufficient error detection mechanisms are employed to measure the received datastream bit error rate, error monitor 120 periodically scans lines 111, 112, 113 and 114 for error occurrence signals received from demodulator 110, and line 106 for RSSI values to determine when the quality of the communications link is unsatisfactory.

The error signals received from demodulator 110 are then analyzed to detect the presence of a predetermined error profile. The error signals may be aggregated into a single error stream, which can then be processed by a FIR filer 122. The response of the FIR filer 122 is then compared by a comparator 123. When the response to the FIR filter 122 exceeds to a predetermined threshold, the predetermined error profile is detected. The FIR filter taps can be designed to respond to a desired error profile. For example, a lowpass FIR response can be chosen to detect a continuous, steady-state distribution of errors, and not to detect short bursts of errors that may not substantially harm the perceived communication quality. The calculation of FIR filter taps responsive to a desired time-domain response is well-known in the art, and thus will not be discussed in further detail.

However, in many applications, such as consumer cordless telephones, product designs face substantial restrictions on power consumption, memory, and circuit complexity. Therefore, a preferred embodiment of the invention utilizes an algorithm implementing a pseudo-FIR-filter with reduced operation requirements. In this embodiment, error monitor 120 includes a bin, or series of registers, that stores up to N errors and the age of each error. An ERROR_WINDOW is defined within error monitor 120 as the length of time over which past errors should be considered. When the age of an error in the bin exceeds the ERROR_WINDOW, that error is removed from the bin.

Error monitor 120 also maintains an ERROR_BURST_WINDOW. The ERROR_BURST_WINDOW is set upon detection of an error on line 111, 112, 113 or 114, and defines a time period over which additional errors will not be detected. The ERROR_BURST_WINDOW ensures that multiple errors caused by short duration bursts of RF interference will only be counted as a single error event, rather than multiple error events as may occur if lines 111–114 were rapidly scanned for the duration of the burst. Accordingly, short and infrequent bursts of interference that may be at most a minor distraction to a user will not trigger an unnecessary channel change.

Figure 2:
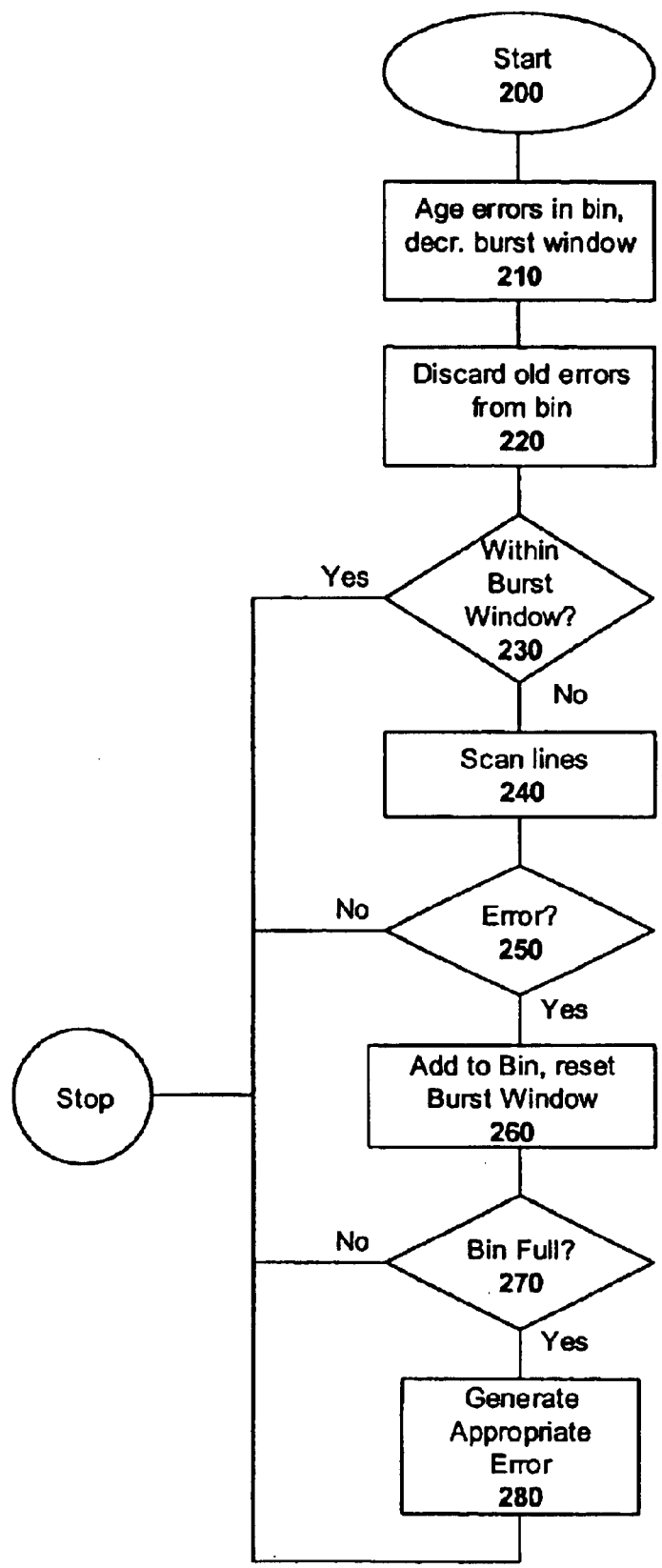
FIG. 2 is a flow chart describing the operation of the invention.

FIG. 2 illustrates the operation of an error monitor cycle in the preferred embodiment of the invention. In step 210, any errors in the bin are aged one increment, and the ERROR_BURST_WINDOW is decremented whenever its value is greater than zero. In step 220, all errors stored in the bin with age greater than ERROR_WINDOW are discarded. Step 230 inquires whether ERROR_BURST_WINDOW is greater than zero, which would indicate that error monitor 120 should not yet sense further errors. If ERROR_BURST_WINDOW is greater than zero, the error monitor cycle is completed.

If error monitor 120 is not within the burst window, lines 111–114 are scanned to detect current errors, step 240. If no error is detected in step 250, the error monitor cycle is completed. If an error is detected, it is added to the bin and the ERROR_BURST_WINDOW is set to a value reflecting the number of error monitor cycles over which subsequent errors should not be detected, step 260. Step 270 detects whether the bin is full. If the bin is not full, the error monitor cycle is complete. If the bin is full, error monitor 120 generates an appropriate error message and transmits the error message to microprocessor 130 via line 121, step 280.

Figure 3:
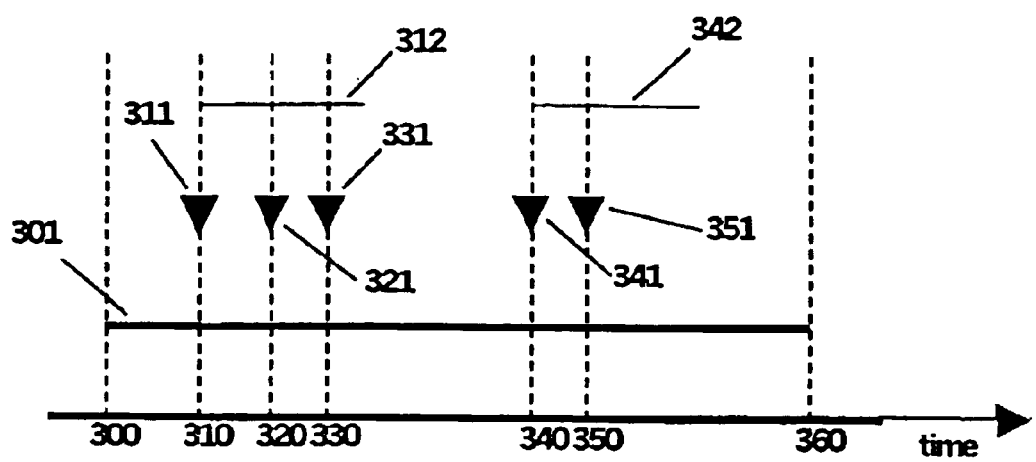
FIG. 3 is a time domain graph showing the operation of the invention over a sample time period.

The operation described above is illustrated by example using the time domain graph of FIG. 3. Time 360 represents the present, while time 300 precedes time 360 by the ERROR_WINDOW illustrated by time line 301, such that errors occuring before time 300 have been discarded from the error bin. At time 310, error 311 was detected by error monitor 120 on line 111, 112, 113 or 114. Accordingly, the error is placed into the bin, and an ERROR_BURST_WINDOW, illustrated by time line 312, is set.

At time 320, error 321 is indicated on line 111, 112, 113 or 114 by demodulator 110. However, because time 320 is within ERROR_BURST_WINDOW 312, error 321 is not detected by error monitor 120, and therefore is not placed into the bin. The bin continues to hold one error.

At time 330, error 331 is indicated on line 111, 112, 113 or 114 by demodulator 110. However, because time 330 is still within ERROR_BURST_WINDOW 312, error 331 is not detected by error monitor 120, and therefore is not placed into the bin. The bin continues to hold one error.

At time 340, error 341 is indicated on line 111, 112, 113 or 114 by demodulator 110. Because ERROR_BURST_WINDOW 312 has expired, error 341 is detected and placed in the bin. Therefore, the bin then holds two errors. Also, a new ERROR_BURST_WINDOW, illustrated by time line 342, is set.

At time 350, error 351 is indicated on line 111, 112,113 or 114 by demodulator 110. However, because time 330 is still within ERROR_BURST_WINDOW 342, error 351 is not detected by error monitor 120, and therefore is not placed into the bin. The bin continues to hold two errors.

Accordingly, at time 360, error monitor has been subjected to two bursts of interference within the ERROR_WINDOW. Each burst was detected by error monitor 120 as a single error event.

In accordance with one aspect of this invention, multiple error messages can be generated by error monitor 120. Low priority alert indicates an unsatisfactory channel, while high priority alert indicates an unusable channel. The priority of the alert is determined by the age of errors within the bin. For example, if a large number of errors within the bin are recent, having comparatively low age values, then the channel upon which the system is operating is deemed to have recently become unusable, and the high priority alert is generated. If the errors within the bin are spaced out relatively uniformly in time, then the channel quality is generally below a level deemed satisfactory, and the low priority alert is generated.

In accordance with another aspect of the invention, the operation of the error monitor varies in response to the receive signal strength indicated on line 106. When the handset is located at long range from the base unit, it is to be expected that the bit error rate will increase due to the transmission power and sensitivity limitations of the transceivers. Such errors are inherent to the system, and cannot be avoided by prompting a channel change. On the other hand, when the received signal is of a high level, the transmission link would normally be relatively free of errors, and error monitor 120 should be increasingly sensitive to any errors that do occur. Therefore, it is desirable for the error monitor to be increasingly tolerant of errors as the receive signal strength is reduced towards its sensitivity threshold.

Therefore, several error monitor parameters can be varied by error monitor 120 in response to the RSSI value received on line 106. For example, in one sample embodiment, the size of the error bin is increased as the RSSI level falls, such that more errors must be detected before a channel change is prompted. As another option, the ERROR_WINDOW and ERROR_BURST_WINDOW can be changed. In such an embodiment, ERROR_BURST_WINDOW is set to a low value when RSSI is high, thereby increasing the sensitivity of error monitor 120 to errors when the received signal is strong. ERROR_BURST_WINDOW is set to a high value when RSSI is low, thereby decreasing the sensitivity of error monitor 120 to error when the received signal is weak.

While the parameters can be varied as described above, the following condition must be satisfied to ensure that an error condition can be detected: ERROR_WINDOW>(N-1)*ERROR_BURST_WINDOW+$T_0$, where N is the size of the bin, and $T_0$ is a constant associated with software and formatter timing. The minimum value for $T_0$ can be determined as $(N)*(T_1+T_2)$. In this equation, $T_1$ is the maximum variation in the time from the occurrence of an error to the time of its indication in hardware; thus, $T_1$ is a function of the particular implementation of an error detection method. $T_2$ is the maximum time from the indication of an error by the error detection mechanism, to the processing of that error by the error monitor-software; i.e. in the embodiment illustrated, $T_2$ is the time required by the particular software architecture to place the error in a bin, set the ERROR_BURST_WINDOW, and detect whether or not the bin is full. Furthermore, To should be increased to allow a safety margin when weak error detection methods are utilized. For example, in a consumer cordless telephone design, typical parameters might be $T_1$=0.35 ms, $T_2$=2 ms, and N=3, yielding a theoretical $T_0$ value of 7.05 ms. However, for a weak error detection method in which only 50% of actual errors are detected, a more conservative value for $T_0$ that ensures adequate error detection might be 20 ms; thus, for such a telephone, ERROR_WINDOW=(N-1)*ERROR_BURST_WINDOW+20 ms.

As the received signal strength nears the sensitivity limit of the handset, ERROR_BURST_WINDOW can be set close to the maximum value that satisfies the above condition. Maximizing ERROR_BURST_WINDOW ensures that errors must be detected more or less continuously throughout the ERROR_WINDOW before the error monitor will generate a warning, and the warning generated will necessarily be a low priority warning rather than a high priority warning.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

We claim:

1. An apparatus for determining that the quality of communications on a digital communication channel is inadequate, the apparatus comprising:
    an error detector that detects the occurrence of errors in data received on the channel;
    a filter to which the error detector output is applied;
    a comparator that indicates when the output of the filter exceeds a predetermined threshold value; and
    a processor for indicating the quality of communications on the channel, and
    wherein the processor indicates that the channel is poor if the errors detected by the error detector are evenly distributed in time through a predetermined time period, and indicates that the channel is unusable if a substantial number of errors detected by the error detector have occurred within a recent period less than the predetermined time period.

2. The apparatus of claim 1, in which the filter has a lowpass frequency response.

3. The apparatus of claim 2, in which the communications channel carries a modulated data signal, the apparatus further includes a receive signal strength meter that measures the power level of the modulated signal, and the predetermined threshold increases as the power level measured by the receive signal strength meter decreases.

4. A method for determining that the quality of communications on a digital communication channel is inadequate, the method comprising the steps of:
    detecting the occurrence of an error in data received on the channel, wherein the detecting of the occurrence of an error further comprises:
        analyzing the received data for errors by the a plurality of error detection mechanisms;
        detecting a data error when one or more of the error detection mechanisms indicate that an error has occurred;
    preventing the detection of any additional errors for a first predetermined time period following the detecting of an error;
    repeating the detecting of errors and preventing steps until a second predetermined time period is reached; wherein the first predetermined time period is substantially shorter than the second predetermined time period and is a function of the second predetermined time period;
    determining whether the number of errors detected within the second predetermined time period exceeds a threshold value; and
    indicating that the quality of communications on the channel is inadequate,
    wherein the occurrence of an error is detected by a plurality of error detection mechanisms, and the error detection mechanisms are independent, stochastic, constant over time in coverage of the received bit stream, and implemented with a sampling interval that is small compared to the error rate.

5. The method of claim 4, which method further includes the step of detecting the strength of the received data.

6. The method of claim 5, in which the duration of the first time period varies with the detected strength of the received data.

7. The method of claim 6, in which the duration of the first time period is increased as the detected strength of the received data becomes low.

8. The method of claim 5, in which the threshold value for detected errors increases when the detected strength of the received data decreases.

9. The method of claim 5, wherein the threshold value for detected errors increases when the detected strength of the received signal decreases.

10. The method of claim 4, in which the step of indicating the quality of communications on the channel is inadequate is further comprised of the substeps of:
  indicating that the channel is poor if the detected errors are evenly distributed in time through the second time period;
  indicating that the channel is unusable if a substantial number of detected errors have occurred within a recent period less than the second time period.

11. A method for determining that the quality of communications on a digital communication channel is inadequate, the method comprising the steps of:
  detecting the occurrence of an error in data received on the channel;
  preventing the detection of any additional errors for a first predetermined time period following the detecting of an error;
  repeating the detecting of errors and preventing steps until a second predetermined time period is reached; wherein the first predetermined time period is substantially shorter than the second predetermined time period and is a function of the second predetermined time period;
  determining whether the number of errors detected within the second predetermined time period exceeds a threshold value;
  detecting the strength of the received data; and
  indicating that the quality of communications on the channel is inadequate,
  wherein the duration of the first time period varies with the detected strength of the received data.

12. The method of claim 11, wherein the duration of the first time period is increased as the detected strength of the received data becomes low.

13. A method for determining that the quality of communications on a digital communication channel is inadequate, the method comprising the steps of:
  detecting the occurrence of an error in data received on the channel;
  preventing the detection of any additional errors for a first predetermined time period following the detecting of an error;
  repeating the detecting of errors and preventing steps until a second predetermined time period is reached; wherein the first predetermined time period is substantially shorter than the second predetermined time period and is a function of the second predetermined time period;
  determining whether the number of errors detected within the second predetermined time period exceeds a threshold value; and
  indicating that the quality of communications on the channel is inadequate, wherein the quality of communications on the channel further comprises:
    indicating that the channel is poor if the detected errors are evenly distributed in time through the second time period; and
    indicating that the channel is unusable if a substantial number of detected errors have occurred within a recent period less than the second time period.

14. A method for determining that the quality of communications on a digital communication channel is inadequate, the method comprising the steps of:
  detecting the occurrence of an error in data received on the channel, wherein the detecting of the occurrence of an error further comprises:
    analyzing the received data for errors by the a plurality of error detection mechanisms;
    detecting a data error when one or more of the error detection mechanisms indicate that an error has occurred;
  preventing the detection of any additional errors for a first predetermined time period following the detecting of an error;
  repeating the detecting of errors and preventing steps until a second predetermined time period is reached; wherein the first predetermined time period is substantially shorter than the second predetermined time period and is a function of the second predetermined time period;
  determining whether the number of errors detected within the second predetermined time period exceeds a threshold value; and
  indicating that the quality of communications on the channel is inadequate,
  wherein the occurrence of an error is detected by a plurality of error detection mechanisms, and the error detection mechanisms are at least one of independent, stochastic, constant over time in coverage of the received bit stream, and implemented with a sampling interval that is small compared to the error rate.

* * * * *